(12) United States Patent
Helbing et al.

(10) Patent No.: US 7,359,635 B2
(45) Date of Patent: Apr. 15, 2008

(54) OPTICALLY-CONTROLLED OPTICAL NETWORK AND SWITCHING NODE THEREFOR

(75) Inventors: Rene Helbing, Palo Alto, CA (US); William R. Trutna, Jr., Atherton, CA (US); Ian Hardcastle, Sunnyvale, CA (US)

(73) Assignee: Avago Technologies Fiber IP Pte Ltd, Singapore (SG)

( * ) Notice: Subject to any disclaimer, the term of this patent is extended or adjusted under 35 U.S.C. 154(b) by 573 days.

(21) Appl. No.: 10/838,504

(22) Filed: May 3, 2004

(65) Prior Publication Data

US 2005/0244156 A1    Nov. 3, 2005

(51) Int. Cl.
*H04J 14/00* (2006.01)
(52) U.S. Cl. .................. 398/57; 398/49; 359/237
(58) Field of Classification Search .......... 398/12, 398/20, 117, 45, 49, 57, 51; 359/117, 237
See application file for complete search history.

(56) References Cited

U.S. PATENT DOCUMENTS

| | | | |
|---|---|---|---|
| 4,897,830 A * | 1/1990 | Hill et al. ............... 398/42 |
| 6,671,256 B1 * | 12/2003 | Xiong et al. ............ 370/230 |
| 6,904,239 B2 * | 6/2005 | Chow et al. ............ 398/49 |
| 2005/0063701 A1 * | 3/2005 | Ovadia et al. .......... 398/45 |
| 2005/0074237 A1 * | 4/2005 | Spivey et al. .......... 398/45 |
| 2005/0095000 A1 * | 5/2005 | DeCusatis et al. ...... 398/45 |
| 2006/0291870 A1 * | 12/2006 | Wan et al. ............ 398/183 |

* cited by examiner

*Primary Examiner*—Chanh D. Nguyen
*Assistant Examiner*—Shaheda A Abdin (57) ABSTRACT

The optically-switched optical network comprises information signal channels allocated for optically transmitting one or more information signals; routing signal channels allocated for optically transmitting routing signals in parallel with the information signals; and switching nodes each operable in responsive to at least one of the routing signals to switch a multi-wavelength optical signal comprising the one or more information signals and the routing signals to another of the switching nodes.

29 Claims, 6 Drawing Sheets

OPTICALLY-CONTROLLED OPTICAL NETWORK AND SWITCHING NODE THEREFOR

BACKGROUND

Modulated optical carriers (optical signals) are used to convey information signals such as voice and data signals. An optical signal typically passes through a number of switching nodes in the course of its journey between a source user device and a destination user device. The switching nodes selectively, and often transiently, connect one of many source user devices to one of many destination user devices for the purpose of routing an optical signal between the user devices. Conventionally, the optical signal is switched electrically at each switching node. The optical signal is converted to an electrical signal, routing information included in the electrical signal is read, the electrical signal is routed to a destination port connected to the next switching node determined from the routing information. Then, at the destination port, the electrical signal is converted back to an optical signal that is transmitted to the next node. The conversion process just described reduces the rate at which the information represented by the information signal can be conveyed through the network.

Some optical networks include a supervisory channel. An optical signal transmitted through the supervisory channel is converted at the nodes of the network to electrical signals that configure the network to establish a transmission path between two user devices. Once the network is configured, optical signals can then be transmitted directly between the user devices. However, the need to convert the optical supervisory signals to electrical signals is expensive and reduces the rate at which the configuration of the network can be changed. This is especially problematical in a network that employs packet switching.

Thus, what is needed is a way to increase the rate at which the configuration of the i optical network can be changed.

SUMMARY OF THE INVENTION

The invention provides an optically-switched optical network in which routing signal channels are allocated for transmitting optical routing signals, and information signal channels are allocated for optically transmitting one or more information signals. The optical routing signals for a given information signal are transmitted in the routing signal channels in parallel with the information signals optically transmitted in respective information signal channels. At each switching node, the optical routing signals are picked off from the routing signal channels and are used to set an optically-controlled optical switch that routes the information signal and the optical routing signals to another node in the network.

In one aspect, the invention provides an optically-switched optical network that comprises information signal channels allocated for optically transmitting one or more information signals; routing signal channels allocated for optically transmitting routing signals in parallel with the information signals; and switching nodes each comprising an optically-controlled optical switching module operable in response to at least one of the routing signals to switch a multi-wavelength optical signal comprising the one or more information signals and the routing signals to another of the switching nodes.

In another aspect, the invention provides an optical switching node comprising an optically-controlled optical switching module. The optical switching module comprises an optically-controlled optical switch, an optical tap, an optical demultiplexer and an optical coupling. The optically-controlled optical switch has a common port, branch ports and a control port. The optical tap has a main output and a sample output. The optical demultiplexer is connected between the sample output of the optical tap and the control port of the optical switch. The optical coupling is between the main output of the optical tap and another of the ports of the optical switch.

In another aspect, the invention provides a method of optically routing an optical information signal through a network, In the method, a multi-wavelength optical signal comprising the optical information signal and optical routing signals in respective routing signal channels is transmitted. Then, at a node of the network, the multi-wavelength optical signal is sampled to provide a sample, the optical routing signal in at least one of the routing signal channels is extracted from the sample, and, in response to the extracted optical routing signal, the multi-wavelength optical signal is optically switched to another node of the network.

Optically switching the information signal in response to optical routing signals optically transmitted together with the information signal increases the rate at which the information represented by the information signal can be transmitted through an optical network

DETAILED DESCRIPTION

Figure 1:
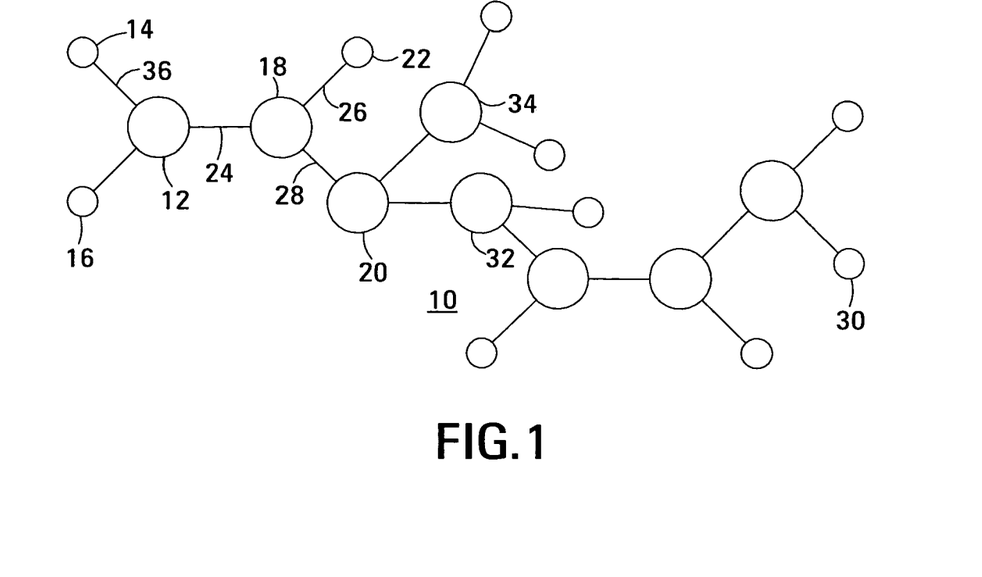
FIG. 1 is a view of a simplified exemplary embodiment of an optical network in accordance with the invention.

FIG. 1 is a view of a simplified exemplary embodiment 10 of an optical network in accordance with the invention. Network 10 is composed of switching nodes (nodes) and user devices interconnected by optical paths. Each optical path is capable of conveying a multi-wavelength optical signal. In the examples described in this disclosure, the optical paths are provided by optical fibers. Other suitable transmission media for optical signals may additionally or alternatively be used to provide the optical paths. Exemplary nodes are shown at 12, 18, 20, 32 and 34, exemplary user devices are shown at 14, 16, 22 and 30 and exemplary optical fibers are shown at 24, 26, 28 and 36.

Located at each node is an optically-controlled optical switching module (not shown in FIG. 1). The optical switching module has a common port and two or more branch ports. In the example of network 10 shown, the optical switching module in each node has two branch ports. The common port is connected to one or the other of the branch ports depending on the switching state of the optical switching module. The optical switching module is typically bidirectional, i.e., in one switching state, light can pass in one direction from the common port to one of the branch ports and can pass in the opposite direction from the one of the branch ports to the common port. In the other switching state, light can pass in one direction from the common port to the other of the branch ports and can pass in the opposite direction from the other the branch ports to the common port.

In network 10, some of the nodes are connected to two user devices and another node. For example, node 12 is connected to user devices 14 and 16 and to node 18. Others of the nodes are connected to one user device and two other nodes. For example, node 18 is connected to nodes 12 and 20 and to user device 22. Yet others of the nodes are connected only to other nodes. For example, node 20 is connected to nodes 18, 30 and 34.

Multi-wavelength optical signals pass through the optical fibers interconnecting the nodes with one another and with the user devices. In an embodiment, the multi-wavelength optical signals are DWDM optical signals.

In network 10, each node operates in one of two switching states to switch a multi-wavelength optical signal between the one or more user devices or the one or more nodes connected to it. For example, in one switching state, node 12 operates to switch a multi-wavelength optical signal received from node 18 to user device 14 and to switch a multi-wavelength optical signal received from user device 14 to node 18. In its other switching state, node 12 operates to switch the multi-wavelength optical signal received from node 18 to user device 16 and to switch the multi-wavelength optical signal received from user device 16 to node 18.

In an example in which user device 14 transmits a multi-wavelength optical signal through network 10 to user device 22, node 12 switches the multi-wavelength optical signal received from user device 14 to optical fiber 24 connected to node 18. Node 18 switches the optical signal received via optical fiber 24 to optical fiber 26 connected to user device 22. Node 18 transmits the multi-wavelength optical signal to user device 22 via optical fiber 26. User device 22 receives the multi-wavelength optical signal from node 18 via optical fiber 26. For user device 14 to transmit a multi-wavelength optical signal to user device 30, nodes between user devices 14 and 30 switch the multi-wavelength optical signal in one of two ways in a manner similar to that just described to establish an optical transmission path that temporarily interconnects user devices 14 and 30.

Figure 2:
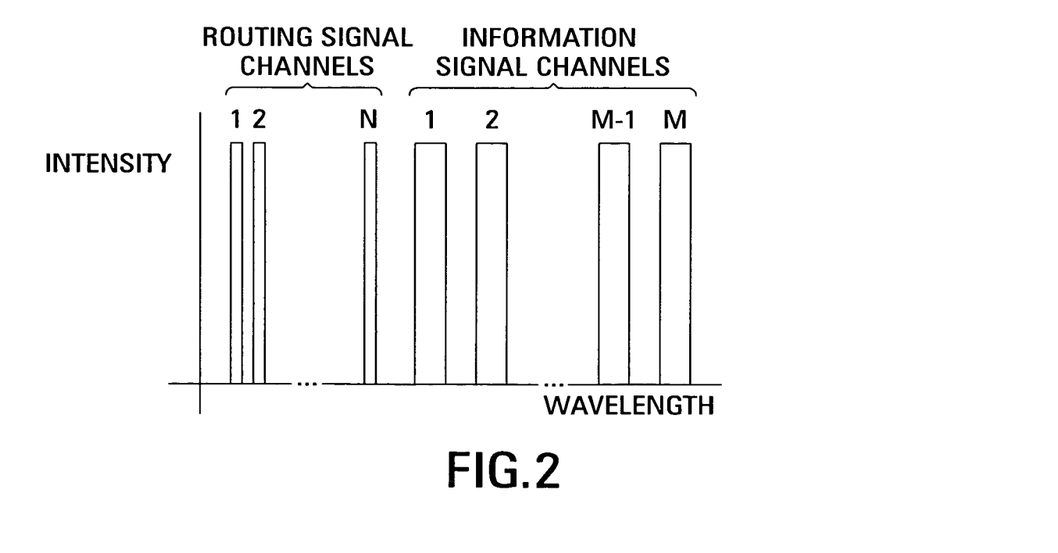
FIG. 2 is a graph showing an example of the channel structure of the network shown in FIG. 1.

FIG. 2 is a graph showing a first example of the optical channel structure of network 10. In an embodiment of network 10, the multi-wavelength optical signals that are transmitted through the network have a channel structure that conforms to the channel structure shown. The multi-wavelength optical signals are composed of optical signals of two types, optical information signals and optical routing signals. The optical information signals represent the information that is transmitted from one user device to another. The optical routing signals define the routing of the multi-wavelength optical signal through the network.

Network 10 is configured to carry multi-wavelength optical signals in (M+N) channels. Of these (M+N) channels, channels 1 through N are routing signal channels that carry the optical routing signals. Channels 1 through M are information signal channels that carry the optical information signals. Optical signals need not be present in all (M+N) channels simultaneously. Different embodiments of the network may have different values of M and N. Moreover, the values of M and N in a given embodiment of the network may change from time-to-time in response to changes in network traffic, for example. The arrangement of the channels shown is merely exemplary: other arrangements of channels may be used. For example, an optical information signal and its optical routing signals may occupy adjacent channels.

The optical routing signals are of very low bandwidth so the routing signal channels have substantially closer channel spacings than the channel spacings of the information signal channels. For example, the channel spacing of the routing signals may be a fraction of the channel spacing of the information signals. Alternatively, a channel structure with uniform bandwidths and channel spacings can be used.

When a multi-wavelength optical signal is transmitted through network 10, each optical information signal in the multi-wavelength optical signal occupies an information signal channel assigned to it, and the optical routing signals occupy the routing signal channels assigned to them. As noted above, not all channels need be occupied. The optical routing signals are transmitted through the network as part of the multi-wavelength optical signal at the same time and by the same route as the optical information signals.

Figure 3:
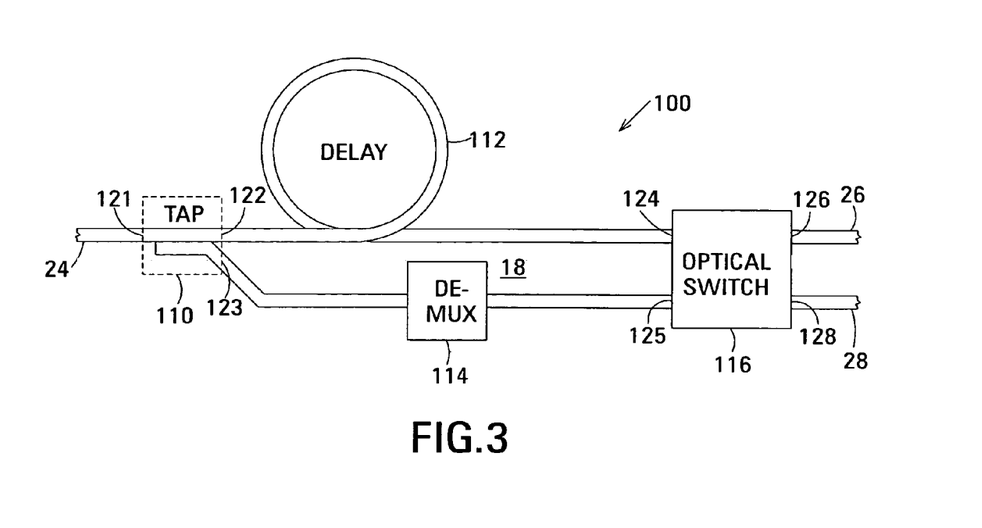
FIG. 3 is a block diagram of an embodiment in accordance with the invention of an exemplary node of the network incorporating a first simplified embodiment of an optically-controlled optical switching module.

FIG. 3 is a block diagram of an embodiment in accordance with the invention of exemplary node 18 of network 10 incorporating a first simplified embodiment 100 of an optically-controlled optical switching module. The remaining nodes of network 10 are similar in structure and operation, but differ from one another in the identity of the optical routing channel exclusively assigned to their respective optical switching modules, as will be described in more detail below. Optical switching module 100 is simplified in the sense that its switching state can be changed only by an optical routing signal received via optical fiber 24 and not by an optical routing signal received via either of optical fibers 26, 28. An embodiment whose switching state can be changed by optical routing signals received via any of the optical fibers connected to it will be described below with reference to FIG. 8.

Optical switching module 100 is composed of an optical tap 110, a delay element 112, a demultiplexer 114 and an optically-controlled optical switch 116. Optical tap 110 has an input port 121, an output port 122 and a sample port 123.

Optical switch 116 has signal ports 124, 126 and 128 and a control port 125. Signal port 124 is the common port and signal ports 126 and 128 are the branch ports of optical switch 116.

Input port 121 of optical tap 110 is optically connected to optical fiber 24 and provides the common port of optical switching module 100. Delay element 112 optically couples the output port 122 of optical tap 110 and the common port 124 of optical switch 116. Optical multiplexer 114 is optically connected between the sample port 123 of optical tap 110 and the control port 125 of optical switch 116. Branch ports 126 and 128 of the optical switch are optically connected to optical fibers 26 and 28, respectively, and provide the branch ports of switching module 100.

In the example shown in FIG. 3, delay element 112 is a loop of optical fiber. Other devices capable of delaying a multi-wavelength optical signal are known in the art and may be used instead. In embodiments in which optical switch 116 has a fast response time and/or in which the configuration of the network changes infrequently, coupling between the output port 122 of optical tap 110 and the common port 124 of optical switch 116 may be provided by an element not conventionally regarded as a delay element. Thus, delay element 112 is optional. Use of a delay element in the node to allow time for the optical switch to change state is advantageous in a network that employs packet switching, i.e., in which the configuration of the network changes frequently and rapidly.

Optically-controlled optical switch 116 switches in the optical domain. In optical switch 116, a multi-wavelength optical signal received at common port 124 is optically switched either to branch port 126 or to branch port 128. The optical switch switches the multi-wavelength optical signal without converting the multi-wavelength optical signal to one or more electrical signals. The branch port to which the multi-wavelength optical signal received at common port 124 is switched depends on the switching state of the optical switch. Moreover, optical switch 116 is reversible, and is additionally capable of optically switching to common port 124 a multi-wavelength optical signal received at branch port 126 or a multi-wavelength optical signal received at branch port 128, depending on its switching state.

Optically-controlled optical switch 116 not only switches in the optical domain but also is controlled in the optical domain. The switching state of optical switch 116, i.e., which of branch ports 126 or 128 is optically connected to common port 124, is determined by an optical signal received at control port 125. Other suitable optically-controlled optical switches include optical switches based on the so-called Self Electro-Optic Effect Device (SEED) disclosed by Bukkems et al. and optical switches based on the interferometric effect such as the optical switch disclosed by Leuthold et al. in All-Optical MZI Wavelength Converters and Switches, 17 J. LIGHTWAVE TECH., 1056-1066 (1999 June).

Optical switching module 100 is suitable for use in an embodiment of network 10 in which the number of optical switching modules is less than the number of routing signal channels. In such embodiment of the network, each of the optical switching modules has a respective one of the routing signal channels exclusively assigned to it. The routing signal channel assigned to each optical switching module exclusively carries the optical routing signal for the optical switching module. The optical routing signals for the optical switching modules in all the nodes appear in the multi-wavelength optical signal simultaneously with, and with a temporal duration equal to, the one or more optical information signals. At each optical switching module, the presence of an optical routing signal in the routing signal channel assigned to the optical switching module optically changes the switching state of optical switch 116 that forms part of optical switching module. The switching state of the optical switch determines the onward route of the multi-wavelength optical signal from the node.

In an example of the operation of optical switching module 100, optical switch 116 has a default switching state in which it switches a multi-wavelength optical signal received via optical fiber 24 connected to common port 124 to branch port 128 connected to optical fiber 28. The presence at control port 125 of an optical routing signal in the routing signal channel assigned to switching module 100 will optically change optical switch 116 to its other (non-default) switching state. In the changed switching state, optical switch 116 switches the multi-wavelength optical signal received via optical fiber 24 to branch port 126 connected optical fiber 26. In the absence of an optical routing signal in the routing signal channel assigned to optical switching module 100, optical switch 116 remains in its default switching state.

Figure 4:
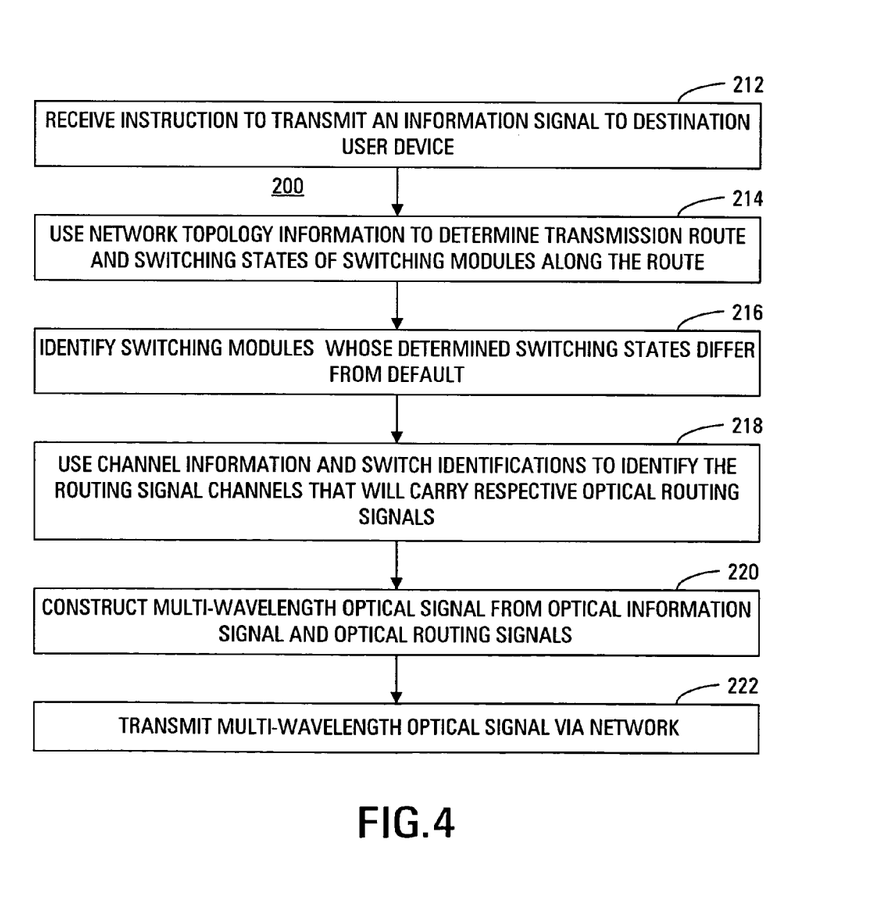
FIG. 4 is a flow chart illustrating an embodiment of a process performed by an exemplary user device to optically transmit an information signal to another user device through an embodiment of the network in which the optical switching modules are structured similarly to the optical switching module shown in FIG. 3.

FIG. 4 is a flow chart illustrating an embodiment 200 of a process performed by an exemplary user device (a source user device) to optically transmit an information signal to another user device (a destination user device) through an embodiment of network 10 in which the nodes incorporate optical switching modules similar to optical switching module 100 shown in FIG. 3. The same process may be used to transmit to the same destination user device more than one information signal in respective information signal channels.

Each user device capable of optically transmitting an information signal through network 10 possesses network topology information and channel information relating to network 10. The network topology information includes, for example, the identities of the user devices, the identities of the nodes and the default switching states of their optical switching modules, and the identities of the optical paths between the user devices and the nodes and among the nodes. The channel information includes information indicating the routing signal channel exclusively assigned to the optical switching module in each node.

In block 212, the source user device receives an instruction to transmit an information signal to the destination user device. The instruction identifies the destination user device and the information signal to be transmitted.

In block 214, in response to the instruction received in block 212, the source user device uses the network topology information to determine a transmission route through the network between the source user device and the destination user device, and to determine the switching state to which the optical switching module of each of the nodes along the transmission route should be set to establish the transmission route.

In block 216, the source user device uses the network topology information to identify each optical switching module whose switching state determined in block 214 differs from its default switching state.

In block 218, the source user device uses the channel information and the switch identifications generated in block 216 to identify the routing signal channels that will carry respective optical routing signals to set the optical switching modules in the corresponding nodes to the switching states determined in block 214.

In block 220, the source user device constructs a multi-wavelength optical signal composed of an optical information signal in a respective information signal channel and an optical routing signal in each of the routing signal channels identified in block 218.

Network 10 may connect the source user device to the destination user with the switching modules of all the nodes along the transmission route in their default switching states. In this event, the multi-wavelength optical signal will include no optical routing signals. Such a multi-wavelength optical signal will nevertheless be regarded as having an optical routing signal in each of the routing signal channels identified in block 218, i.e., an optical routing signal in none of the routing signal channels.

To construct the multi-wavelength optical signal, the source user device generates an optical information signal that represents the information signal identified by the instruction received in block 212. The source user device additionally generates an optical routing signal for each of the routing signal channels identified in block 216. The source user device optically multiplexes the optical routing signals together with the optical information signal to form the multi-wavelength optical signal. The optical information signal is a modulated optical signal in one of the information signal channels. As noted above, the optical routing signals optically change the switching states of the optical switch of only those optical switching modules identified in block 216. The remaining optical switching modules remain in their default switching states.

In block 222, the source user device transmits the multi-wavelength optical-signal constructed in block 220 via the network 10.

In an embodiment, the source user device incorporates a routing engine (not shown) that performs the process shown in FIG. 4. Alternatively, routing signal channel identities similar to those generated in block 218 are computed in advance for every combination of source user device and destination user device in the network, or for a subset of these combinations. The computation process performs processes similar to those described above with reference to blocks 214, 216 and 218. Each source user device includes a memory that stores the pre-computed routing signal channel identities relevant to it. For example, the routing signal channel identities may be stored in a look-up table linked to a list of destination user devices. Then, during information signal transmission operations, the source user device uses the look-up table and the destination user device identified in the instruction received in block 212 to identify the routing signal channels. The source user device then performs in the operation described above with reference to block 220 to construct a multi-wavelength optical signal using the routing channel identities provided by the look-up table. Finally, the source user device performs the operation described above with reference to block 222 to transmit the multi-wavelength optical signal. The pre-computed routing signal channel identities may alternatively be stored in the source user devices linked to a list of destination user devices in a form other than a look-up table.

Referring again to FIG. 1, in an example in which user device 14 is the source user device that originates a multi-wavelength optical signal composed of one or more optical information signals and a number of optical routing signals, the multi-wavelength optical signal passes from user device 14 to node 12. In its default switching state, node 12 optically connects optical fiber 36 connected to user device 14 to optical fiber 24 connected to node 18. Thus, node 12 routes the multi-wavelength optical signal to node 18 via optical fiber 24.

Referring now to FIG. 3, the operation of optical switching module 100 in node 18 when it receives the multi-wavelength optical signal via optical fiber 24 will now be described. In optical switching module 100, optical tap 110 extracts a sample of the multi-wavelength optical signal and delivers the sample to demultiplexer 114 via sample port 123. The remainder of the multi-wavelength optical signal proceeds via output port 122 and delay element 112 to common port 124 of optical switch 116. The delay element temporarily stores the multi-wavelength optical signal during the time needed by the optical routing signal (if included) in the multi-wavelength optical signal to optically change the switching state of optical switch 116. When the multi-wavelength optical signal includes an optical routing signal in the routing signal channel assigned to optical switching module 100 in node 18, optical switch 116 has changed its switching state by the time the multi-wavelength optical signal arrives at the optical switch. Otherwise, optical switch 116 remains in its default switching state.

Demultiplexer 114 receives the sample of the multi-wavelength optical signal from optical tap 110. The demultiplexer is structured to extract from the sample any optical signal present in the routing signal channel assigned to the optical switching module 100 of node 18. Thus, the demultiplexer extracts from the sample the optical routing signal (if present) in the routing signal channel assigned to the optical switching module of node 18 and forwards such optical routing signal to the control port 125 of optical switch 116. The optical routing signal received at control port 125 optically changes the switching state of the optical switch to connect common port 124 to branch port 126, the port that is connected to optical fiber 26. In instances in which the routing process performed by source user device 14 generates no optical routing signal in the routing signal channel assigned to the optical switching module of node 18, the absence of an optical routing signal at control port 125 leaves optical switch 116 in its default switching state in which it connects common port 124 to branch port 128, the port connected to optical fiber 28. Thus, by the time the multi-wavelength optical signal reaches optical switch 116 after being temporarily stored in delay element 112, the optical switch is in the state that will route the multi-wavelength optical signal towards the destination user device via optical fiber 26 or 28.

Other nodes of network 10 incorporate optical switching modules similar in structure and operation to optical switching module 100, but the optical switching modules are mutually different in the identity of the routing signal channel assigned to them. The optical switching modules are therefore mutually different in the identity of the routing signal channel from which demultiplexer 114 extracts the optical routing signal. Each optical switching module switches from its default switching state in response to an optical routing signal in the routing signal channel assigned to it. Otherwise the switching module stays in its default switching state to route the multi-wavelength optical signal that includes at least one optical information signal through network 10 towards the destination user device.

In an alternative embodiment of network 10 that incorporates a variation on optical switching module 100 just described, two routing signal channels are exclusively assigned to each node of the network. This halves the maximum number of nodes that can be controlled by a given number of routing signal channels, but increases reliability. In such embodiment, the optical switch in the optical switching module of each node does not have a default switching state, and the demultiplexer of the optical switching module has an output for each of the two assigned routing signal channels. The two demultiplexer outputs are optically connected to respective control ports of the optical switch. The optical switch operates such that an optical routing signal in the routing signal channel connected to one of its control ports optically sets the optical switch to one of its switching states whereas an optical routing signal in the routing signal channel connected to the other of its control ports optically sets the optical switch to the other of its switching states. In this embodiment, the identity of the assigned routing signal channel via which the optical routing signal is received defines the switching state of the optical switch.

Figure 5:
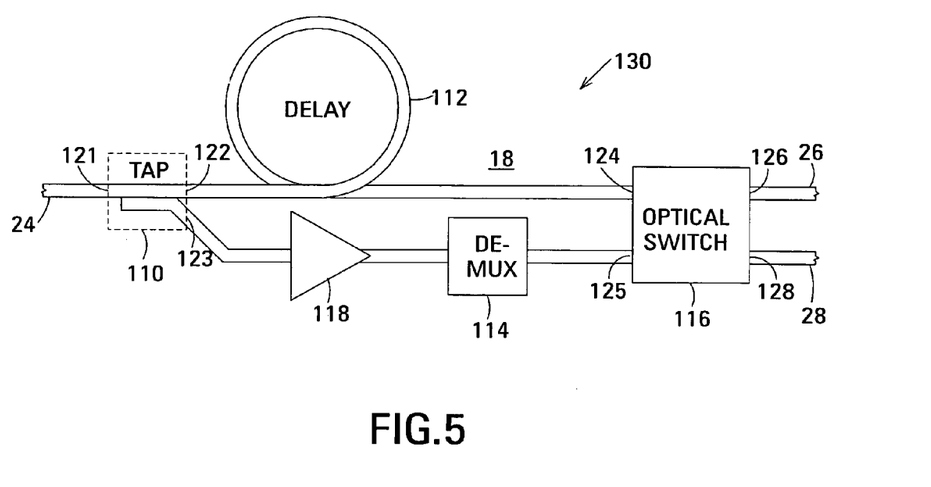
FIG. 5 is a block diagram of an embodiment in accordance with the invention of an exemplary node of the network incorporating a second simplified embodiment of an optically-controlled optical switching module.

FIG. 5 is a block diagram of an embodiment in accordance with the invention of exemplary node 18 of network 10 incorporating a second simplified embodiment 130 of an optical switching module. The remaining nodes of network 10 are similar in structure and operation, but differ from one another in the manner described above. Optical switching module 130 is simplified in the sense that its switching state can be changed only by an optical routing signal received via optical fiber 24 and not by an optical routing signal received via either of optical fibers 26 and 28. Optical switching module 130 is for use in an embodiment of network 10 in which the number of optical switching modules is less than the number of routing signal channels. Each of the optical switching modules is assigned an exclusive routing signal channel, as described above. Elements of optical switching module 130 shown in FIG. 5 that correspond to elements of optical switching module 100 described above with reference to FIG. 3 are indicated using the same reference numerals and will not be described again here.

In optical switching module 130, optical amplifier 118 is optically connected in series with demultiplexer 114 between sample port 123 of optical tap 110 and control port 125 of optical switch 116. Optical amplifier 118 is operable to amplify at least part of the sample of the multi-wavelength optical signal output by the optical tap. In the example shown, the optical amplifier is located between optical tap 110 and demultiplexer 114 and amplifies the entire sample of the multi-wavelength optical signal. The optical amplifier may alternatively be located between the demultiplexer and control input port 125. In this case, the optical amplifier amplifies the optical routing signal output by the demultiplexer. An additional optical amplifier (not shown) may be located between optical fiber 24 and common port 124 of optical switch 116. Additionally or alternatively, an optical amplifier may be located between either or both of ports 126 and 128 of optical switch 116 and optical fibers 26 and 28, respectively.

Operation of switching module 130 is similar to that of optical switching module 100 and so will not be separately described.

Figure 6:
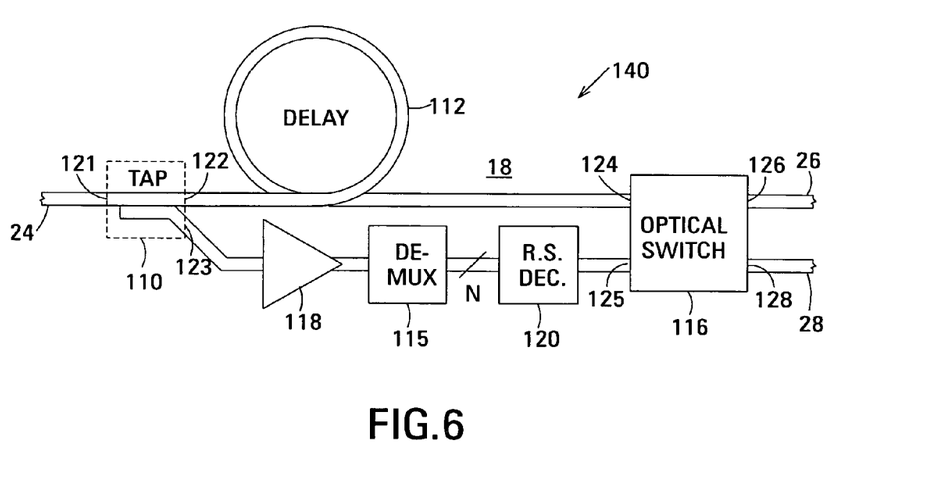
FIG. 6 is a block diagram of an embodiment in accordance with the invention of an exemplary node of the network incorporating a third simplified embodiment of an optically-controlled optical switching module.

FIG. 6 is a block diagram of an embodiment in accordance with the invention of exemplary node 18 of network 10 incorporating a third simplified embodiment 140 of an optical switching module. Other nodes of network 10 are similar in structure and operation. Optical switching module 140 is simplified in the sense that its switching state can be changed only by optical routing signals received via optical fiber 24 and not by optical routing signals received via either of optical fibers 26 and 28. Elements of optical switching module 140 shown in FIG. 6 that correspond to elements of optical switching modules 100 and 130 described above with reference to FIGS. 3 and 5, respectively, are indicated using the same reference numerals and will not be described again here.

Optical switching module 140 is suitable for use in embodiments of network 10 in which the number of optical switching modules exceeds the number of routing signal channels. In such embodiment of the network, each optical switching module is assigned an exclusive switch address. Each switch address is coded by the presence or absence of optical routing signals in specific ones of the routing signal channels. In the example shown in FIG. 6, the optical switch in the optical switching module has a default switching state. The presence at the optical switching module of the optical routing signals that represent the switch address of the optical switching module optically changes the switching state of the optical switch from its default switching state. The presence at the optical switching module of optical routing signals representing anything but the switch address of the optical switching module leaves the optical switching module in its default switching state. Again, the bandwidth of the optical routing signals is small so that the routing signal channels can have small bandwidths and narrow spacings compared with the bandwidths and spacings of the information signal channels.

Figure 7:
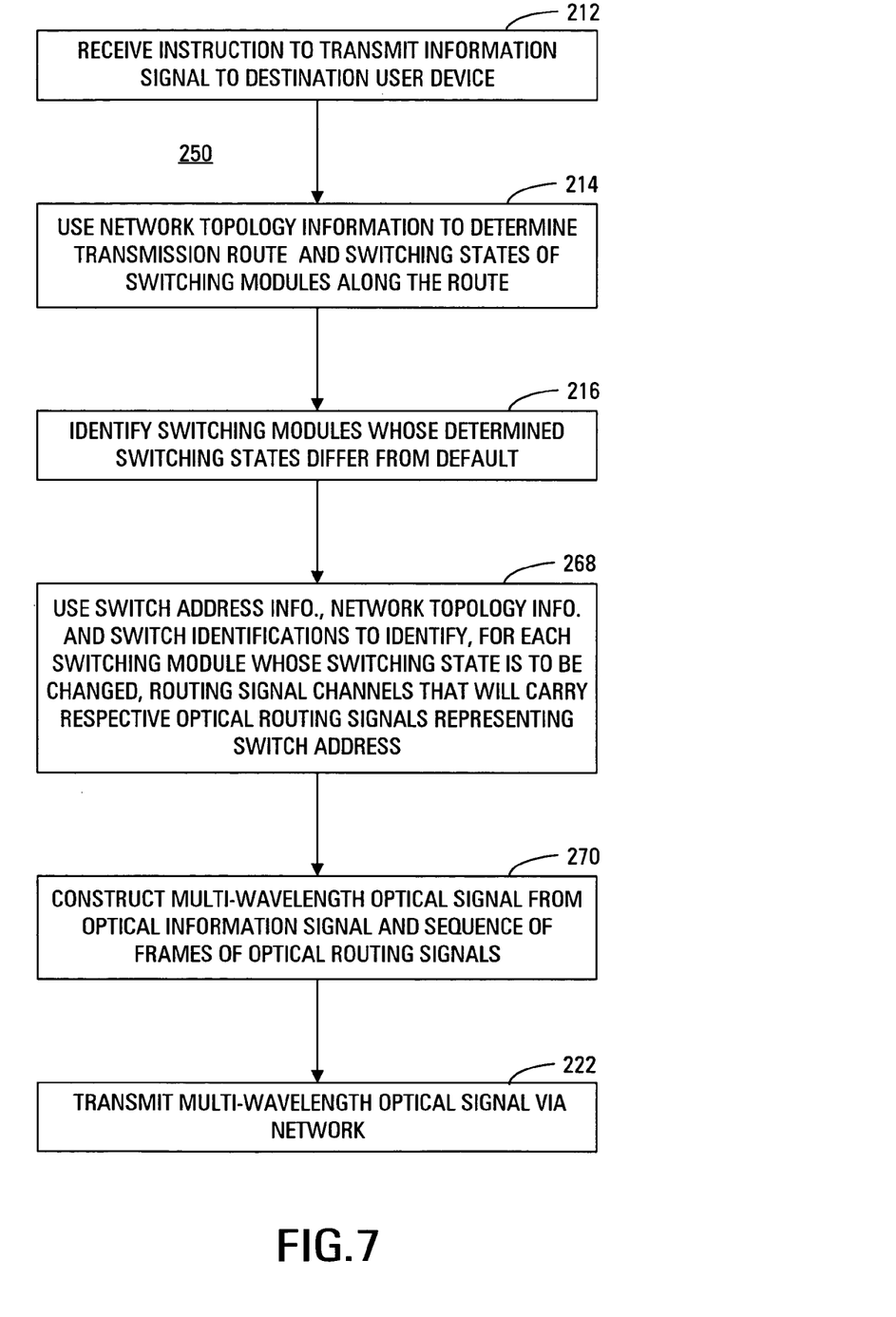
FIG. 7 is a flow chart illustrating an embodiment of a process performed by an exemplary user device to optically transmit an information signal to another user device through an embodiment of the network in which the optical switching modules are structured similarly to the optical switching module shown in FIG. 6.

FIG. 7 is a flow chart illustrating an embodiment 250 of a process performed by an exemplary user device (a source user device) to optically transmit an information signal to another user device (a destination user device) through an embodiment of network 10 in which the optical switching modules are similar in structure to optical switching module 140 shown in FIG. 6. In the example to be described, a single routing signal channel is assigned to each bit of the switch address. Elements of the method 250 that are the same as elements of the method 200 described above are indicated using the same reference numerals and will not be described again.

Each user device capable of transmitting an information signal through network 10 possesses network topology information and switch address information relating to network 10. The network topology information includes, for example, the identities of the user devices, the identities of the nodes and their default switching states, and the connections between the user devices and the nodes and among the nodes. The switch address information identifies, for each optical switching module, the routing signal channels for which the presence of an optical routing signal indicates the switch address of the optical switching module. The presence of the optical routing signals corresponding to the switch address at the switching module optically changes the switching state of the optical switching module from its default switching state.

Blocks 212, 214 and 216 are performed as described above with reference to FIG. 4.

In block 268, the source user device uses the switch address information, the network topology information and the switch identifications generated in block 216 to identify, for each optical switching module whose switching state is to be changed, the routing signal channels that will carry the optical routing signals that represent the switch address of the optical switching module. The optical routing signals that represent the switch address of a single optical switching module will be called a routing signal frame.

In block 270, the source user device constructs a multi-wavelength optical signal composed of an optical information signal in a respective information signal channel and a sequence of routing signal frames in the routing signal channels. For each optical switching module identified in block 216, the respective routing signal frame is composed of an optical routing signal in each of the routing signal channels identified in block 268 and an absence of an optical routing signal in the remaining routing signal channels. The routing signal frame represents the switch address of the optical switching module.

In block 272, the source user device transmits the multi-wavelength optical signal through the network. The multi-wavelength optical signal includes the sequence of routing signal frames simultaneously with at least the start of the optical information signal. Alternatively, the multi-wavelength optical signal may include the sequence of routing signal frames slightly in advance of the optical information signal. In the sequence of routing signal frames, each routing signal frame has a temporal duration that is short compared with the temporal duration of the optical information signal. The sequence of routing signal frames may be transmitted more than once during transmission of the optical information signal.

In an example, the switch addresses of the optical switching modules of all the nodes of network 10 are represented by the presence or absence of optical routing signals in routing signal channels 1 through 4, and optical switching module 140 in above-described exemplary node 18 has a switch address of 1010. In this example, the routing signal frame representing the switch address of switching module 140 of node 18 has respective optical routing signals in routing signal channels 1 and 3 and an absence of respective optical routing signals in routing signal channels 2 and 4. Receipt of such a routing signal frame at the optical switching module of node 18 optically changes the switching state of the optical switching module from its default switching state, and causes optical switching module 140 of node 18 to connect optical fiber 24 to output fiber 26. On the other hand, the presence at node 18 of any routing signal frame other than the routing signal frame that represents the switch address assigned to the optical switching module of node 18, i.e., the simultaneous presence of respective optical routing signals in routing signal channels 1 and 3 and the absence of optical routing signals in routing signal channels 2 and 4, leaves the switching state of the optical switching module of node 18 unchanged. Thus, to cause node 18 to route the multi-wavelength signal from optical fiber 24 to optical fiber 26, one of the routing signal frames included by the user device in the multi-wavelength optical signal has optical routing signals present in routing signal channels 1 and 3 and no optical routing signals in routing signal channels 2 and 4 to represent the switch address of the optical switching device of node 18. The presence of this switch address at node 18 optically changes the switching state of node 18 from the default state to the switching state in which the node connects optical fibers 24 and 26.

In optical switching module 140, an optical demultiplexer 115 and a routing signal decoder 120 (labelled R.S. Dec.) are optically connected in series between sample port 123 of optical tap 110 and control port 125 of optical switch 116. One or more optical amplifiers may optionally be located between sample port 123 and control input port 125. For example, the example shown has optical amplifier 118 optically connected between sample port 123 and optical demultiplexer 115. Additional optical amplifiers (not shown) may also be used, as described above.

Optical demultiplexer 115 receives from optical tap 110 a sample of the multi-wavelength optical signal received via optical fiber 24. The optical demultiplexer is structured to demultiplex the sample to provide parallel optical signals in the N routing signal channels. N parallel optical paths connect the output of the optical demultiplexer to the input of routing signal decoder 120. The routing signal decoder operates in response to the optical routing signals received from the optical demultiplexer to provide an optical control signal to the control port 125 of optical switch 116 when the received optical routing signals correspond to the switch address assigned to switching module 140. The optical control signal causes the optical switch to switch from its default switching state, as described above. The routing information decoder provides the optical control signal for a predetermined time sufficient all of the optical information signal to pass through the node, after which it reverts to its original state.

Referring additionally to FIG. 7, process 250 may be performed by a routing engine as described above with reference to FIG. 4. Alternatively, the routing signal channel identifications generated in blocks 214, 216 and 268 for various combinations of source user device and destination user device may be computed in advance and stored in a look-up table in a manner similar to that described above with reference to FIG. 4. Then, in block 270, the source user device constructs the multi-wavelength optical signal using the look-up table and the destination device identified in the instruction received in block 212 to identify the routing signal channels that will carry respective routing signal channels in each routing signal frame that represents the switch address of a respective optical switching module whose state is to be changed. In block 272, the multi-wavelength optical signal is transmitted as just described.

In an alternative embodiment of network 10 that incorporates a variation on optical switching module 140 just described, two of the routing signal channels are reserved for optical state signals. This reduces the maximum number of nodes that can be controlled by a given number of routing signal channels, but increases reliability. In such embodiment, optical switch in each optical switching module does not have a default switching state. Instead, the optical switching module receiving an optical state signal in one of the reserved routing signal channels simultaneously with the routing signal frame that represents the switch address of the optical switching module sets the optical switch to one of its switching states, the optical switching module receiving an optical state signal in the other of the reserved routing signal channels simultaneously with the routing signal frame that represents the switch address of the optical switching module sets the optical switch to the other of its switching states.

In embodiments of optical switching module 140 in which two of the routing signal channels are reserved for optical state signals, the sequence of routing signal frames includes a routing signal frame that represents the switch addresses of the optical switching module of every node along the transmission route of the multi-wavelength optical signal. Each routing signal frame additionally has an optical state signal in one of the two routing signal channels reserved for the optical state signals, and no optical state signal in the other of the reserved routing signal channels. The identity of the routing signal channel that carries the optical state signal defines the switching state to which the optical switching module whose switch address is represented by the remainder of the routing signal frame is to be set.

In a switching node structured to operate in such a network embodiment, the routing signal decoder operates in response to a routing signal frame that includes the switch address of the optical switching module of the node. Upon receiving a routing signal frame that includes its switch address, the routing signal decoder in the optical switching module feeds to the control port of the optical switch an optical control signal whose state depends on the identity of the reserved routing signal channel in the routing signal frame that carries the optical state signal. The state of the optical control signal determines the state of the optical switch. In one embodiment, the optical control signal is a single-channel binary signal whose state determines the switching state of the optical switch. In another embodiment, the optical control signal is a two-channel signal. An optical signal in one of the control signal channels sets the optical switch to one of its switching states and an optical signal in the other of the control signal channels sets the optical switch to the other of its switching states. For example, the routing signal decoder may be structured to connect the reserved routing signal channels to the optical switch in response to receiving a routing signal frame that includes the switch address of the optical switching module. The identity of the reserved routing signal channel that carries the optical state signal then determines the switching state of the optical switch.

Other embodiments of optical switching module 140 are for use in embodiments of network 10 in which two routing signal channels are assigned to represent each bit of the switch addresses. In such embodiments, one state of each bit of the switch address is represented by the presence of an optical routing signal in the one of the routing signal channels assigned to represent the bit, and the other state of the bit is represented by the presence of an optical routing signal in the other of the routing signal channels assigned to represent the bit. This alternative halves the number of nodes that can be addressed by optical routing signals in a given number of routing signal channels, but provides greater reliability. In such embodiments, routing signal decoder 120 is structured to look for the switch address represented by an optical routing signal in the appropriate one of each of the pairs of routing signal channels. Some of the embodiments in which two routing signal channels are assigned to represent each bit of the switch addresses achieve maximum reliability by additionally reserving two of the routing signal channels for optical state signals, as described above.

The exemplary optical switching module embodiments described above are simplified in the sense that the switching state of the optical switching module can only be changed by one or more optical routing signals received via optical fiber 24. Such embodiments are useful in embodiments of network 10 in which multi-wavelength optical signals are transmitted through the network in a single direction. In other embodiments of network 10, an ability to transmit a multi-wavelength optical signal from any user device as a source user device to any other user device as a destination user device is desirable.

Figure 8:
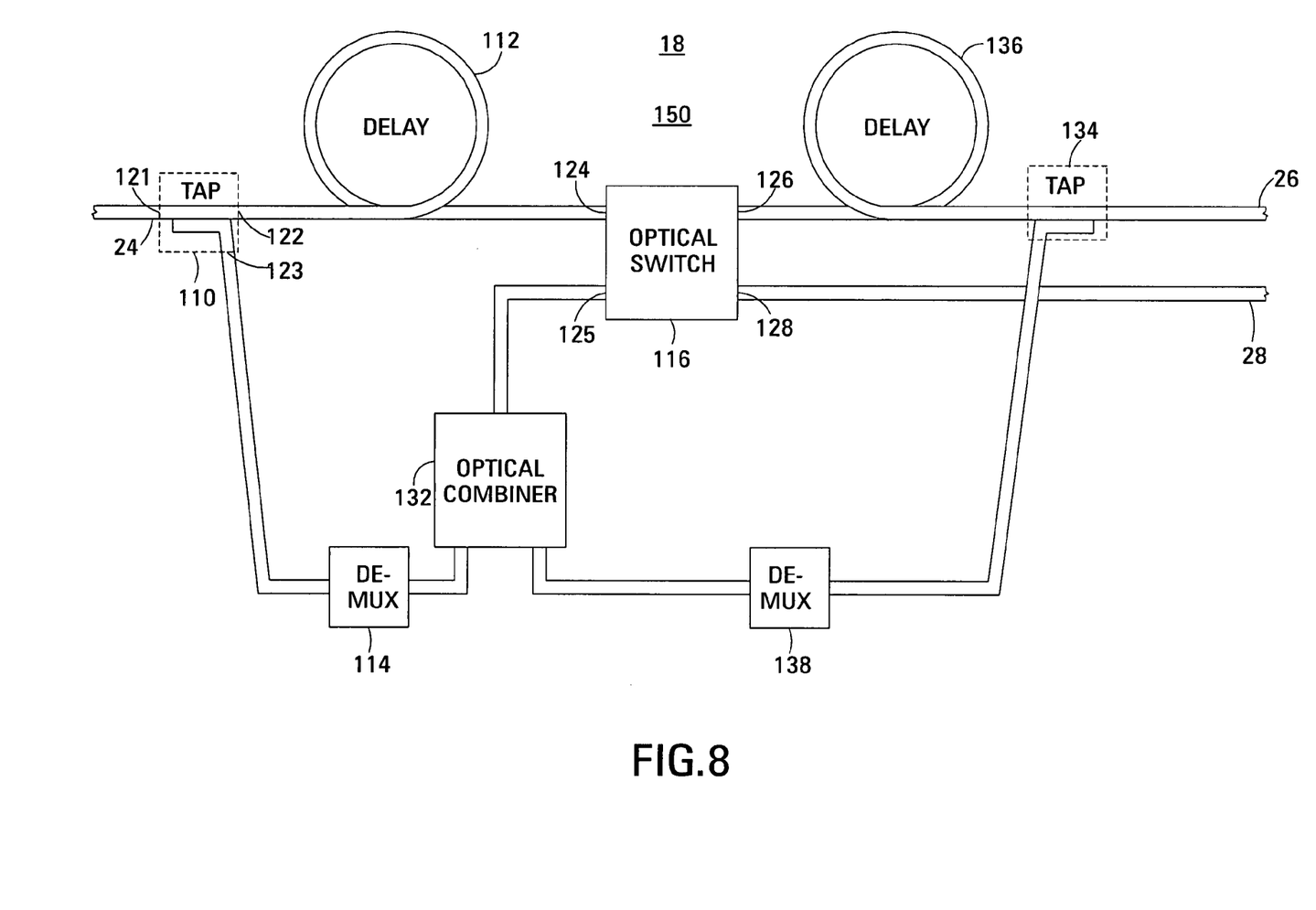
FIG. 8 is a block diagram of an embodiment in accordance with the invention of an exemplary node of the network incorporating a fourth embodiment of an optically-controlled optical switching module.

FIG. 8 is a block diagram of an embodiment in accordance with the invention of exemplary node 18 of network 10 incorporating a fourth embodiment 150 of an optical switching module. The switching state of optical switching module 150 can be changed from the default switching state by an optical routing signal received via either of optical fibers 24 and 26 connected to the switching module. In switching module 150, optical switch 116 has a default switching state in which common port 124 is connected to branch port 128. Hence, there is no need in this embodiment to enable an optical routing signal received via optical fiber 28 to change the switching state of optical switch 116.

Optical switching module 150 is based on switching module 100 described above with reference to FIG. 3, but may alternatively be based on optical switching module 130 shown in FIG. 5 or on optical switching module 140 shown in FIG. 6. Elements of optical switching module 150 shown in FIG. 8 that correspond to elements of optical switching module 100 described above with reference to FIG. 3 are indicated using the same reference numerals and will not be described again here.

In optical switching module 150, a two-input optical combiner 132 is interposed between the output of demultiplexer 114 and the control port 125 of optical switch 116. The output of demultiplexer 114 is optically connected to one of the inputs of the optical combiner and the output of the optical combiner is connected to the control input 125 of optical switch 116. Optical tap 134 and delay element 136 are optically connected in series between optical fiber 26 and branch port 126 of optical switch 116. Optical tap 134 is similar in structure and operation to optical tap 110 and delivers a sample of a multi-wavelength optical signal transmitted towards optical switch 116 via optical fiber 26 at a sample port similar to sample port 123 of optical tap 110. Delay element 136 is similar in structure and operation to delay element 112 and delays the multi-wavelength optical signal received via optical fiber 26 relative to the sample of the multi-wavelength optical signal output by optical tap 134.

Switching module 150 additionally has a demultiplexer 138 optically connected between the sample port of optical tap 134 and another of the inputs of optical combiner 132. Demultiplexers 114 and 138 are each structured to extract from respective samples of the multi-wavelength optical signals received from optical taps 110 and 134, respectively, any optical signal present in the routing signal channel assigned to optical switching module 150 of node 18.

With respect to a multi-wavelength optical signal received via optical fiber 24, optical switching module 150 operates similarly to optical switching module 100 described above with reference to FIG. 3, except that the optical routing signal output by demultiplexer 114 passes through optical combiner 132 to the control input 125 of optical switch 116. The optical routing signal output by multiplexer 114 to the control input 125 of optical switch 116 optically changes the switching state of the optical switch from its default switching state.

With respect to a multi-wavelength optical signal received at switching module 150 via optical fiber 26, optical tap 134 extracts a sample of the multi-wavelength optical signal and delivers the sample to demultiplexer 138 via its sample port. The remainder of the multi-wavelength optical signal proceeds via the output port of optical tap 134 and delay element 136 to branch port 126 of optical switch 116. The delay element temporarily stores the multi-wavelength optical signal during the time needed by the optical routing signal included in the multi-wavelength optical signal to optically change the state of optical switch 116 from its default switching state.

Optical demultiplexer 138 receives the sample of the multi-wavelength optical signal from the sample port of optical tap 134. Demultiplexer 134 is structured to extract from the sample any optical signal present in the routing signal channel assigned to optical switching module 150. Thus, the demultiplexer extracts from the sample the optical routing signal (if present) in the routing signal channel assigned to the optical switching module of node 18 and forwards such optical routing signal to the control port 125 of optical switch 116 via optical combiner 132. The optical routing signal output by demultiplexer 138 to the control input 125 of optical switch 116 optically changes the switching state of the optical switch from its default switching state, and the multi-wavelength optical signal received at branch port 126 from delay element 136 passes through the optical switch to common port 124 and optical fiber 24.

In the above-described operations of optical switching module 150, optical combiner 132 passes the optical routing signal output by multiplexer 114 or by demultiplexer 138 to the control input 125 of optical switch 116. The optical routing signal received at control input 125 optically changes the switching state of optical switch 116 from the default switching state and allows the optical switch to route a multi-wavelength optical signal received via optical fiber 24 to optical fiber 26 and vice versa. Otherwise, in the default switching state of optical switch 116, a multi-wavelength optical signal received via optical fiber 24 is routed to optical fiber 28 and vice versa.

In an alternative embodiment of optical switching module 150 in which common port 124 is optically connected to branch port 126 in the default switching state of optical switch 116, optical tap 134 and delay element 136 are located between optical fiber 28 and branch port 128 instead of between optical fiber 26 and branch port 126.

In an embodiment of optical network 10 in which optical switch 116 does not have a default state, a three-input optical combiner is used as optical combiner 132 and an additional optical tap (not shown) similar to optical tap 134 and an additional delay element (not shown) similar to delay element 136 are additionally connected in series between optical fiber 28 and branch port 128. A demultiplexer (not shown) similar to demultiplexer 138 is connected between the sample port of the additional tap and the third input of the optical combiner.

In the above-described embodiments of network 10, each node is described as incorporating a single optical switching module, such as optical switching module 100 shown in FIG. 3. In other embodiments of network 10, at least some of the nodes of the network incorporate more than one optical switching module to enable multi-wavelength optical signal transmitted between different pairs of user devices to pass through such nodes concurrently. In such an embodiment, the bandwidth available for transmitting multi-wavelength optical signals through the network, e.g., the so-called C band between 1529.75 nm and 1569.59 nm, is divided into wavelength bands. Then, in each of the wavelength bands, some of the channels are designated as routing signal channels and others of the channels are designated as information signal channels.

Figure 9:
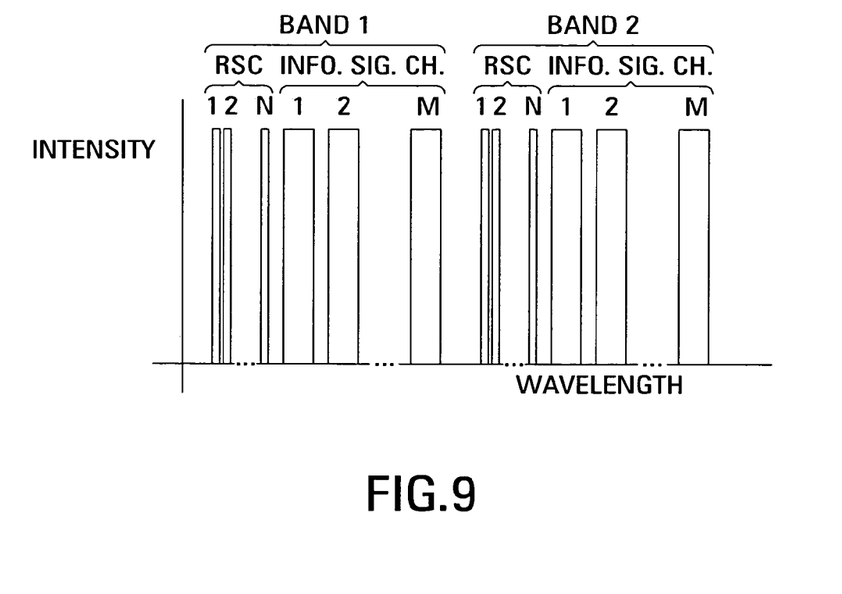
FIG. 9 is a graph showing a second example of the optical channel structure of the network in which the available bandwidth is divided wavelength bands.

FIG. 9 is a graph showing a second example of the optical channel structure of network 10 in which the available bandwidth of the network is divided into wavelength bands. In the example shown, the available bandwidth is divided into two wavelength bands of equal bandwidth. The wavelength bands are called band 1 and band 2. A portion of each band, indicated by RSC, is divided into N routing signal channels. The remainder of each band, indicated by INFO. SIG. CH. is divided into M information signal channels. The number N of routing signal channels is sufficient to provide individual routing information to every node of network 10 as described above. The bandwidth and channel spacing of the routing signal channels is less than those of the information signal channels, also as described above. In an embodiment, the channel spacing of the routing signal channels is a fraction of that of the information signal channels.

In other embodiments of network 10, the available bandwidth is divided into more than two wavelength bands. Additionally or alternatively, the wavelength bands differ in their bandwidth and their numbers of information signal channels.

Figure 10:
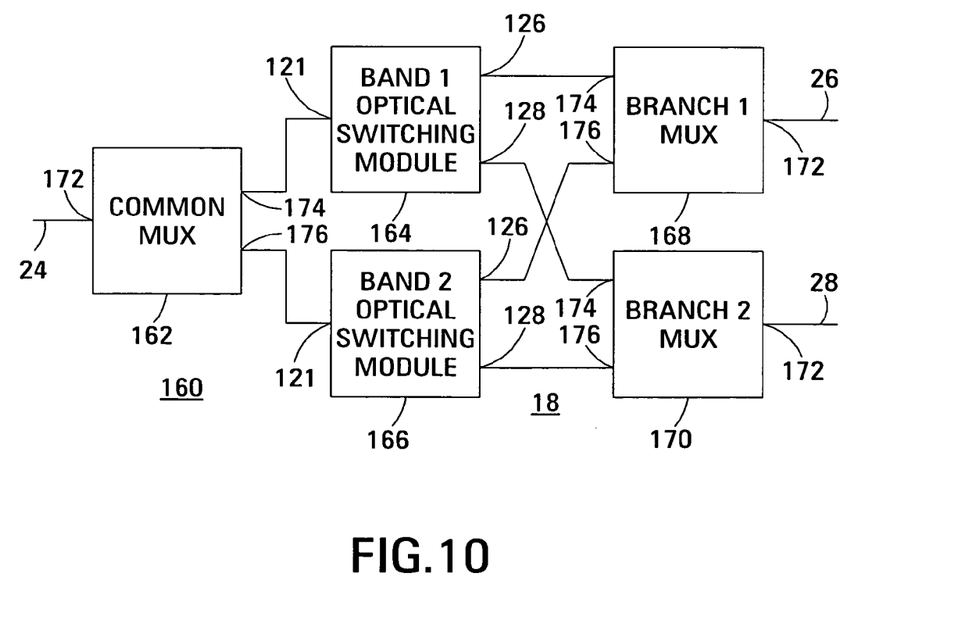
FIG. 10 is a block diagram of an embodiment in accordance with the invention of an exemplary node suitable for use in an embodiment of the network in which the available bandwidth is divided into two wavelength bands.

FIG. 10 is a block diagram of an embodiment 160 in accordance with the invention of exemplary node 18 suitable for use in an embodiment of network 10 in which the available bandwidth is divided into two wavelength bands. At least some of the remaining nodes of network 10 are similar in structure and operation. Node 160 can readily be modified to make nodes suitable for use in embodiments of network 10 in which the available bandwidth is divided into more than two bands.

Node 160 is composed of a common multiplexer 162, a band 1 optical switching module 164, a band 2 optical switching module 166, a branch 1 multiplexer 168 and a branch 2 multiplexer 170. Each of the multiplexers 162, 168 and 170 has a common port 172, a band 1 port 174 and a band 2 port 176.

Multiplexers 162, 168 and 170 are bidirectional in the sense that each operates as a demultiplexer with respect to light received at common port 172 and as a multiplexer with respect to light received at branch ports 174 and 176. Specifically, an optical signal in the wavelength range of band 1 received at common port 172 is output at band 1 port 174, whereas an optical signal in the wavelength range of band 2 received at common port 172 is output at band 2 port 176. An optical signal in the wavelength range of band 1 received at band 1 port 174 is output at common port 172, and an optical signal in the wavelength range of band 2 received at band 2 port 176 is also output at common port 172. An optical signal in the wavelength range of band 1 received at band 1 port 174 and an optical signal in the wavelength range of band 2 concurrently received at band 2 port 176 are output spatially overlapped with one another at common port 172.

Each of the optical switching modules 164 and 166 is similar in structure and operation to any one of the above-described optical switching modules 100, 130, 140 and 150. Embodiments of optical switching modules 164 and 166 similar to optical switching modules 100, 130 and 150 differ from one another in that band 1 switching module 164 has a routing signal channel in band 1 exclusively assigned to it, whereas switching module 166 has a routing signal channel in band 2 exclusively assigned to it. An embodiment of switching module 164 similar to switching module 140 has a switch address represented by optical routing signals in the routing signal channels of band 1, whereas an embodiment of switching module 166 similar to switching module 140 has a switch address represented by optical routing signals in the routing signal channels of 2.

The common port 172 of common multiplexer 162 is connected to optical fiber 24 and provides the common port of node 18. The band 1 port 174 of common multiplexer 162 is connected to the common port 121 of band 1 optical switching module 164. The branch 1 port 126 of band 1 optical switching module 164 is connected to the band 1 port 174 of branch 1 multiplexer 168. The branch 2 port 128 of band 1 optical switching module 164 is connected to the band 1 port 174 of branch 2 multiplexer 170.

The band 2 port 176 of common multiplexer 162 is connected to the common port 121 of band 2 optical switching module 166. The branch 1 port 126 of band 2 optical switching module 166 is connected to the band 2 port 176 of branch 1 multiplexer 168. The branch 2 port 128 of band 2 optical switching module 166 is connected to the band 2 port 176 of branch 2 multiplexer 170. The common port 172 of branch 1 multiplexer 168 is connected to optical fiber 26. The common port 172 of branch 2 multiplexer 170 is connected to optical fiber 28.

In an example of the operation of node 160, a multi-wavelength optical signal in band 1 received from optical fiber 24 at common port 172 of common multiplexer 162 is output from common multiplexer 162 at band 1 port 174. The multi-wavelength optical signal passes to common port 121 of band 1 optical switching module 164. An example of the multi-wavelength optical signal that includes an optical routing signal in the band 1 routing signal channel assigned to band 1 optical switching module 164 of node 18 optically changes the switching state of the optical switch in band 1 optical switching module 164. Consequently, band 1 optical switching module 164 outputs the multi-wavelength optical signal at branch port 126. The multi-wavelength optical signal passes to the band 1 branch port 174 of the branch 1 multiplexer 168. Branch 1 multiplexer 168 outputs the multi-wavelength optical signal to optical fiber 26 from common port 172.

An example of the multi-wavelength optical signal that lacks an optical routing signal in the band 1 routing signal channel assigned to band 1 optical switching module 164 of node 18 leaves the optical switch in band 1 optical switching module 164 in its default switching state. With the optical switch in its default switching state, band 1 optical switching module 164 outputs such multi-wavelength optical signal at branch 2 port 128 to branch 2 multiplexer 170. The branch 2 multiplexer outputs the multi-wavelength optical signal from common port 172 to optical fiber 28.

A multi-wavelength optical signal in band 2 received via optical fiber 24 is output from common multiplexer 162 at band 2 port 176 and passes to the common port 121 of band 2 optical switching module 166. An example of the multi-wavelength optical signal that includes an optical routing signal in the band 2 routing signal channel assigned to band 2 optical switching module 166 of node 18 is output from band 2 optical switching module 166 at branch 1 port 126. The multi-wavelength optical signal passes to the band 2 port 176 of branch 1 multiplexer 168. Branch 1 multiplexer 168 outputs the multi-wavelength optical signal to optical fiber 26 from the common port 172 of branch 1 multiplexer 168. An example of the multi-wavelength optical signal that lacks an optical routing signal in the band 2 routing signal channel assigned to band 2 optical switching module 166 of node 18 is output from band 2 optical switching module 166 at branch 2 port 128. Such multi-wavelength optical signal passes to the band 2 port 176 of branch 2 multiplexer 170 and is output to optical fiber 28 from the common port 172 of branch 2 multiplexer 170.

Thus, multi-wavelength optical signals in each of the two bands of network 10 pass independently through node 18 and are switched from optical fiber 24 to optical fiber 26 or 28 independently of one another.

In embodiments of network 10 in which the available bandwidth of the network is divided into more than two wavelength bands, the number of optical switching modules is equal to the number of wavelength bands and each of the multiplexers has band ports equal in number to the wavelength bands.

This disclosure describes the invention in detail using illustrative embodiments. However, it is to be understood that the invention defined by the appended claims is not limited to the precise embodiments described.

We claim:

1. An optically-switched optical network, comprising:
   information signal channels allocated to one or more optical information signals, wherein said information signal channels transmit on a fiber optic line, each respective one of said information signal channels corresponding to a respective optical wavelength range, wherein the wavelength ranges corresponding to said information signal channels are different from each other;
   routing signal channels allocated to optical routing signals transmitted on said fiber optic line with the optical information signals, each respective one of said routing signal channels corresponding to a respective optical wavelength range, wherein the wavelength ranges corresponding to said routing signal channels are different from each other and are different from the wavelength ranges corresponding to said information signal channels; and
   switching nodes, each comprising an optically-controlled optical switching module operable in response to at least one of the optical routing signals to switch a multi-wavelength optical signal comprising the one or more optical information signals and the optical routing signals to another of the switching nodes.

2. The optical network of claim 1, additionally comprising:
   end user devices; and
   optical paths extending between the end user devices and ones of the switching nodes and among ones of the switching nodes.

3. The optical network of claim 1, in which the optical switching module has one of the routing signal channels exclusively assigned thereto.

4. The optical network of claim 3, in which:
   the optical switching module has a default switching state; and
   the optical switching module operates in response to an optical routing signal in the one of the routing signal channels to change to another switching state.

5. The optical network of claim 1, in which the optical switching module has more than one of the routing signal channels exclusively assigned thereto.

6. The optical network of claim 5, in which an optical routing signal in one of the exclusively-assigned routing signal channels sets the optical switching module to a respective switching state.

7. The optical network of claim 1, in which the optical switching module is assigned a unique switch address represented by a presence of an optical routing signal in each of selected ones of the routing signal channels and an absence of an optical routing signal in others of the routing signal channels.

8. The optical network of claim 7, in which:
   the optical switching module has a default switching state; and
   the optical switching module operates in response to the presence of an optical routing signal in each of the selected ones of the routing signal channels and the absence of an optical routing signal in the others of the routing signal channels to change to another switching state.

9. The optical network of claim 7, in which ones of the routing signal channels are reserved for optical state signals.

10. The optical network of claim 9, in which the presence of an optical routing signal in each of the selected ones of the routing signal channels and the additional presence of an optical state signal in one of the reserved routing signal channels sets the optical switching module to a respective switching state.

11. The optical network of claim 1, in which:
   the network has an available bandwidth divided into wavelength bands; and the routing signal channels and the information signal channels are allocated among the wavelength bands.

12. The optical network of claim 11, in which ones of the switching nodes each comprise optical switching modules equal in number to the wavelength bands.

13. An optical switching node, comprising an optically-controlled optical switching module, the optical switching module comprising:
  an optical input, wherein optical information signals and routing signals are receivable at the optical input, wherein a respective information signal channels is allocated to each respective one of the optical information signals, each respective one of said information signal channels corresponding to a respective optical wavelength range, wherein the wavelength ranges corresponding to said information signal channels are different from each other, and wherein a respective routing channel is allocated to each respective one of said routing signals, each respective one of said routing signal channels corresponding to a respective optical wavelength range, wherein the wavelength ranges corresponding to said routing signal are different from each other and are different from the wavelength ranges corresponding to said information signal channels;
  an optically-controlled optical switch comprising a common port, branch ports and a control port, the common port being optically associated with the optical input, the optical switch being operable in response to at least one of the optical routing signals to switch a multi-wavelength optical signal comprising the one or more optical information signals and the optical routing signals;
  an optical tap comprising a main output and a sample output, the optical tap being connected to the optical input;
  an optical demultiplexer connected between the sample output of the optical tap;
  and the control port of the optical switch; and
  an optical coupling between the main output of the optical tap and another of the ports of the optical switch.

14. The optical switching node of claim 13, in which the optical switching module additionally comprises an optical amplifier between the sample output of the optical tap and the control port of the optical switch.

15. The optical switching node of claim 13, in which:
  the optical switching node constitutes part of an optical network; and
  the demultiplexer is structured to output an optical routing signal in no more than one routing signal channel exclusively assigned to the optical switching module.

16. The optical network of claim 15, in which:
  the optical switch has a default switching state; and
  the optical switch is structured to change to another switching state in response to the optical routing signal.

17. The optical switching node of claim 13, in which:
  the optical switching node constitutes part of an optical network; and
  the demultiplexer is structured to provide output optical routing signals in respective routing signal channels.

18. The optical switching node of claim 13, further comprising:
  a routing signal decoder between the optical demultiplexer and the control port of the optical switch, and wherein the routing signal decoder is structured to output an optical control signal in response to receiving optical routing signals in selected ones of the routing signal channels, the selected ones of the routing signal channels representing a switch address of the optical switching module.

19. The optical network of claim 18, in which:
  the optical switch has a default switching state; and
  the optical switch is structured to change to another switching state in response to the optical control signal.

20. The optical switching node of claim 18, in which:
  ones of the routing signal channels are each reserved for an optical state signal; and
  the routing signal decoder is structured to operate in response to receiving optical routing signals in selected ones of the routing signal channels, the selected ones of the routing signal channels representing a switch address of the optical switching module, to output an optical control signal whose state depends on the identity of the routing signal channel in which the optical state signal is additionally received.

21. The optical switching node of claim 20, in which the state of the optical control signal optically sets the optical switch to a respective switching state.

22. The optical switching node of claim 13, in which the optical switching module additionally comprises:
  an optical combiner interposed between the demultiplexer and the control port of the optical switch;
  an additional optical tap comprising a main output and a sample output;
  an additional optical demultiplexer connected between the sample output of the additional optical tap and an input of the optical combiner; and
  an additional optical coupling between the main output of the optical tap and another of the ports of the optical switch.

23. The optical switching node of claim 22, in which the optical switching module additionally comprises a routing signal decoder interposed between each of the optical demultiplexers and respective inputs of the optical combiner.

24. The optical switching node of claim 13, additionally comprising:
  additional optical switching modules, the optical switching modules each comprising a common port, a first branch port and a second branch port;
  a first multiplexer comprising a common port and band ports equal in number to the
  optical switching modules, each of the band ports optically connected to the common port of a respective one of the optical switching modules; and
  a second multiplexer and a third multiplexer, each comprising a common port and band ports equal in number to the optical switching modules, each of the band ports of the second multiplexer optically connected to the first branch port of a respective one of the optical switching modules, each of the band ports of the third multiplexer optically connected to the second branch port of a respective one of the optical switching modules.

25. The optical switching node of claim 13, in which the optical coupling comprises a delay element.

26. A method of routing at least one optical information signal through a network, the method comprising:
  transmitting over an optical fiber a multi-wavelength optical signal comprising said at least one optical information signal and additionally comprising optical routing signals in respective routing signal channels, wherein at least one information signal channel is allocated to said at least one optical information signal, said at least one information signal channel corresponding to a respective optical wavelength range, and wherein each respective routing channel corresponds to a respective optical wavelength range, wherein the wavelength ranges corresponding to said routing signal channels are different from each other and are different from the wavelength range corresponding to said at least one information signal channel; and at a node in the network: sampling the multi-wavelength optical signal to provide a sample, extracting from the sample the optical routing signal in at least one of the routing signal channels, and in response to the extracted optical routing signal, optically switching the multi-wavelength optical signal towards another node of the network.

27. The method of claim 26, in which:

one of the routing signal channels is exclusively assigned to the node; and the extracting comprises extracting the optical routing signal in the one of the routing signal channels exclusively assigned to the node.

28. The method of claim 26, in which:

two of the routing signal channels are exclusively assigned to the node; and the extracting comprises extracting the optical routing signals in the two of the routing signal channels assigned exclusively to the node.

29. The method of claim 26, in which:

optical routing signals in selected ones of the routing signal channels represent an address of the node;

the extracting comprises extracting optical routing signals in the ones of the routing signal channels to provide an optical control signal; and the optical switching comprises switching the multi-wavelength optical signal in response to the optical control signal.

* * * * *

UNITED STATES PATENT AND TRADEMARK OFFICE
CERTIFICATE OF CORRECTION

PATENT NO.         : 7,359,635 B2
APPLICATION NO.    : 10/838504
DATED              : April 15, 2008
INVENTOR(S)        : Rene Helbing et al.

It is certified that error appears in the above-identified patent and that said Letters Patent is hereby corrected as shown below:

Column 19, Line 11, Claim 13, delete "channels" and insert -- channel --;

Column 19, Line 21, (Approx.), Claim 13, after "signal" insert -- channels --;

Column 20, Line 35-53 (Approx.), Claim 24, delete "24. The optical switching node of claim 13, additionally comprising:
    additional optical switching modules, the optical switching modules
        each comprising a common port, a first branch port and a second branch port;
    a first multiplexer comprising a common port and band ports equal in number to the
    optical switching modules, each of the band ports optically connected to the
        common port of a respective one of the optical switching modules; and
    a second multiplexer and a third multiplexer, each comprising a common port and band ports
        equal in number to the optical switching modules, each of the band ports of the
        second multiplexer optically connected to the first branch port of a respective one of
        the optical switching modules, each of the band ports of the third multiplexer
        optically connected to the second branch port of a respective one of the optical
        switching modules."
and insert -- 24. The optical switching node of claim 13, additionally comprising:
    additional optical switching modules, the optical switching modules
        each comprising a common port, a first branch port and a second branch port;
    a first multiplexer comprising a common port and band ports equal in number to the optical
        switching modules, each of the band ports optically connected to the common port of
        a respective one of the optical switching modules; and
    a second multiplexer and a third multiplexer, each comprising a common port and band ports
        equal in number to the optical switching modules, each of the band ports of the
        second multiplexer optically connected to the first branch port of a respective one of
        the optical switching modules, each of the band ports of the third multiplexer
        optically connected to the second branch port of a respective one of the optical
        switching modules. --.

Signed and Sealed this
Eleventh Day of January, 2011

David J. Kappos
*Director of the United States Patent and Trademark Office*